United States Patent [19]

Narahara

[11] 3,798,357

[45] Mar. 19, 1974

[54] MAGNETIC RECORDING AND REPRODUCING SYSTEM

[75] Inventor: Hisaaki Narahara, Tokyo, Japan

[73] Assignee: Sony Corporation, Tokyo, Japan

[22] Filed: Nov. 30, 1972

[21] Appl. No.: 310,863

[30] Foreign Application Priority Data

Nov. 30, 1971 Japan .............................. 46-96504

[52] U.S. Cl. ......................... 178/5.4 CD, 178/6.6 A

[51] Int. Cl. ........................... H04n 5/78, H04n 9/32

[58] Field of Search ........ 178/5.4 CD, 6.6 A, 6.6 SF

[56] References Cited

UNITED STATES PATENTS

| | | | |
|---|---|---|---|
| 3,586,762 | 6/1971 | Hodge | 178/5.4 CD |
| 3,626,087 | 12/1971 | Tomioka | 178/5.4 CD |
| 3,728,477 | 4/1973 | Kubota | 178/5.4 CD |
| 3,749,835 | 7/1973 | Arimura | 178/5.4 CD |

*Primary Examiner*—Howard W. Britton
*Attorney, Agent, or Firm*—Lewis H. Eslinger, Esq.; Alvin Sinderbrand, Esq.

[57] ABSTRACT

In a system in which at least the chrominance components of composite color television signals are recorded during alternate line intervals and omitted during the remaining line intervals to form a checkerboard array on the recording medium and are recreated by combining reproduced chrominance components with delayed replicas, additional phase inversion circuits are provided to recreate PAL signals. The red color difference components of PAL composite signals are modulated on the color subcarrier in one phase on alternate lines and the opposite phase during the remaining lines. The inversion circuits include circuits for generating two conversion frequencies of such values that one of them reconverts alternate line intervals to have one phase condition and the other reconverts the remaining line intervals to have the opposite phase condition, thus recreating a PAL signal.

8 Claims, 3 Drawing Figures

MAGNETIC RECORDING AND REPRODUCING SYSTEM

BACKGROUND OF THE INVENTION

1. Field of the Invention

This invention relates to an improved system for recording a PAL color television signal on a magnetic medium in such a way that only alternate line intervals of at least the chrominance components are recorded, thereby permitting closer spacing of adjacent recorded tracks on the medium, and reproducing the recorded signals in such a way as to recreate a PAL signal.

U.S. Patent Application Ser. No. 277,815 filed Aug. 3, 1972 (Docket S0350), and assigned to the assignee of the present application describes a system that permits increased utilization of the surface area of a magnetic recording medium. Instead of requiring guard bands on which no signal is recorded between adjacent tracks of signals, it was proposed to record the tracks closer together by recording only alternate intervals of at least low frequency components of the signals and aligning adjacent tracks so that an area in which low frequencies were recorded in one track would be directly adjacent an area in which no low frequencies were recorded in the next track.

In accordance with previously established practices the color television signal which consisted of luminance and chrominance components was divided by filtering means into a relatively low frequency portion that comprised the main luminance signals and a high frequency portion that comprised the chrominance signals. After this separation, the chrominance signals were converted from their relatively high frequency band to a relatively low frequency band and the luminance components were used to frequency modulate a relatively high frequency oscillator. Thus the bands occupied by the signals as applied to the recording medium were actually reversed from their relative locations in the original composite color television signal. In accordance with application Ser. No. 277,815 only alternate intervals of the chrominance signals were recorded. For example, odd line intervals of the chrominance signal might be recorded in the first field and either even or odd line intervals recorded in the second field, depending on the angular orientation of the adjacent tracks.

In order to recreate a complete color television signal, the reproducing equipment as described in application Ser. No. 277,815 included means to feed each reproduced and reconverted interval of chrominance signals to the picture reproducing apparatus and at the same time to feed each of said chrominance signals through delay means to the same picture reproducing apparatus. The delay required is exactly equal to the length of each interval during which such chrominance signals were recorded and exactly equal to the interval between successive recorded chrominance signals. Thus the delayed replicas of the chrominance signals could be used to fill in the gaps in the originally recorded signals without noticeably detracting from the quality of the reproduced picture.

In the NTSC system one chrominance component is recorded on the color subcarrier in one phase relationship and the other chrominance component is recorded on the same carrier at a phase displaced 90° from the first component. This 90° relationship does not shift from line to line and thus there is no problem in omitting and then reinserting alternate line intervals of the chrominance signals. However, in the PAL color television system the blue color difference signal components are always modulated on a color subcarrier at the same phase relationship but the red color difference signals are modulated during one line interval at a phase relationship 90° ahead of that of the blue color difference signals and, during the next line interval, in a phase relationship 90° behind the blue color difference signals. When only alternate line intervals of the chrominance components of a PAL signal are recorded, this shifting of the phase of the red color difference signals is lost. When the gaps between recorded chrominance signals are filled in by replicas of preceding recorded signals, the phase inversion that is required to operate a PAL receiver is missing.

Accordingly, it is an object of the present invention to provide a system in which advantage may be taken of the recording of alternate line intervals of chrominance signal components of a PAL color television signal, but with means included in the playback apparatus to recreate the phase inversion of the red color difference signal components on alternate line intervals.

BRIEF DESCRIPTION OF THE INVENTION

In accordance with the present invention a PAL color television signal is first separated into luminance and chrominance components. The luminance components are used to frequency modulate an oscillator and the chrominance components are frequency converted to a lower frequency band and are gated so that alternate line intervals of the chrominance signals pass through the gate circuit. These gated and frequency converted chrominance signals are then combined with the frequency modulated carrier and applied to recording head means to record the signals on a magnetic tape.

The playback apparatus in accordance with this invention comprises means to pick up the recorded signals and separate them into high frequency and low frequency components. The high frequency components include the carrier frequency modulated by the luminance signal and this carrier is demodulated to reproduce the luminance signal.

The low frequency components comprise the chrominance signals and these are applied to two frequency converters. One of the frequency converters is supplied with a conversion signal having a frequency higher than the original carrier and the burst signal frequency of the composite PAL color television signal and the other frequency converter is supplied with the signal having a lower frequency than the burst and carrier signal frequency. The difference between each of these conversion signals and the carrier and burst signal frequency of the converted chrominance signal is such that both of the frequency converters have an output chrominance signal with a burst and carrier frequency that is the same as the original burst and carrier frequency of the PAL color television signal. However, because of the fact that frequency conversion in one instance is achieved by means of a relatively high conversion frequency and in the other instance is achieved by means of a relatively low conversion frequency, the two reconverted signals will be of opposite phase condition and will be equivalent to the two conditions of a normal PAL chrominance signal.

A single-pole-double-throw switching means is connected to receive these two reconverted chrominance signals and to transmit them alternately to a mixing circuit to be mixed with the demodulated luminance signal to provide a reconstituted PAL composite color television signal.

DESCRIPTION OF THE PREFERRED EMBODIMENTS

Figure 1:
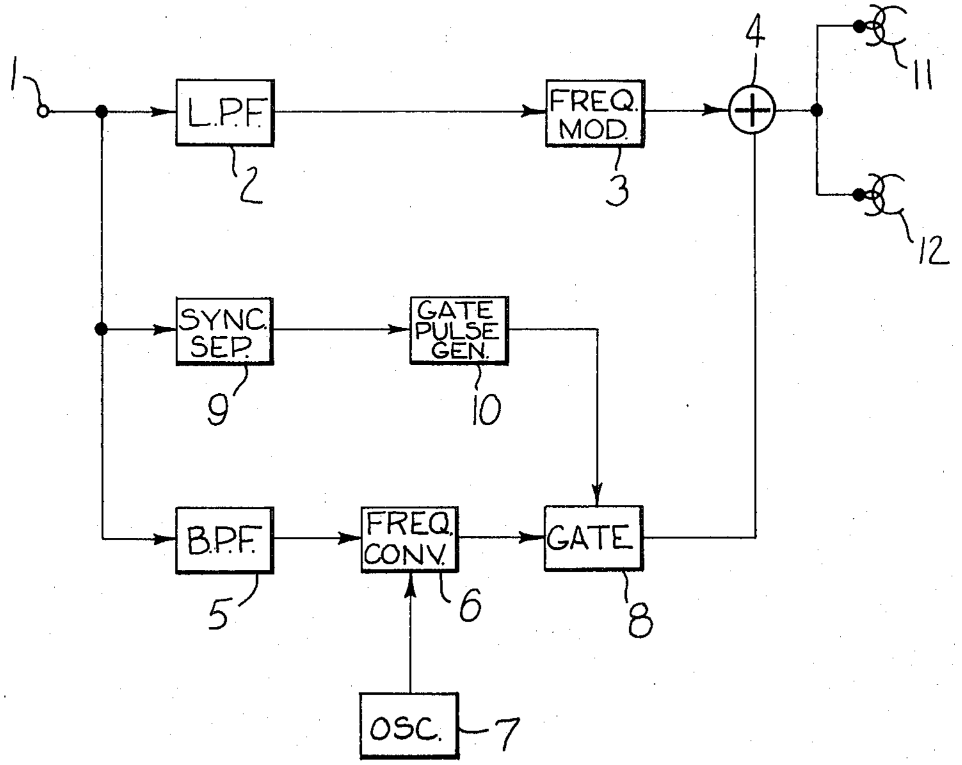
FIG. 1 is a block diagram of a magnetic recording device for recording PAL color television signals in accordance with the invention.

An embodiment of a recording system according to the present invention will be now described with reference to FIG. 1. In the figure a PAL composite color television signal is applied to an input terminal 1, which is connected to a low-pass filter 2 that transmits the luminance signal components of the color television signal. The luminance signal separated by the filter 2 is applied to a frequency modulator 3 to frequency modulate a carrier signal having a predetermined constant frequency. The output signal from the frequency modulator 3 is applied to a mixer 4.

The input terminal 1 is also connected to a bandpass filter 5 which passes therethrough the chrominance signal components that include first and second red color difference signals that have oppositely phased modulation axes and occur during alternate line intervals, and blue color difference signals that have a fixed modulation axis. The output of the filter 5 is connected to a frequency converter 6 that is also supplied with a reference signal from an oscillator 7 so that the chrominance signal is frequency converted to a lower frequency band having a carrier frequency of, for example, 560 KHz. The chrominance signal, which is frequency converted to the lower frequency band, is fed to a gate circuit 8 which is gated in response to horizontal synchronizing signals derived from the composite television signal by a synchronizing signal separating circuit 9 and used to control a square wave gate pulse generator circuit 10. Accordingly, the gate circuit 8 passes the chrominance signal, which, at that point, has been frequency converted to the lower frequency band, during alternate line intervals, only. This intermittent, or gated, chrominance signal will include either the first red color difference signal that has one modulation axis or it will include the second red color difference signal that has the oppositely phased modulation axis, but it will not include both the first and second color difference signals. The gated chrominance signal is applied to the mixer 4 and combined therein with the modulated output signal applied thereto from the frequency modulator 3. The combined output signal from the mixer 4 is fed to magnetic heads 11 and 12 to be recorded on a magnetic medium, for example, a magnetic tape (not shown).

Figure 2:
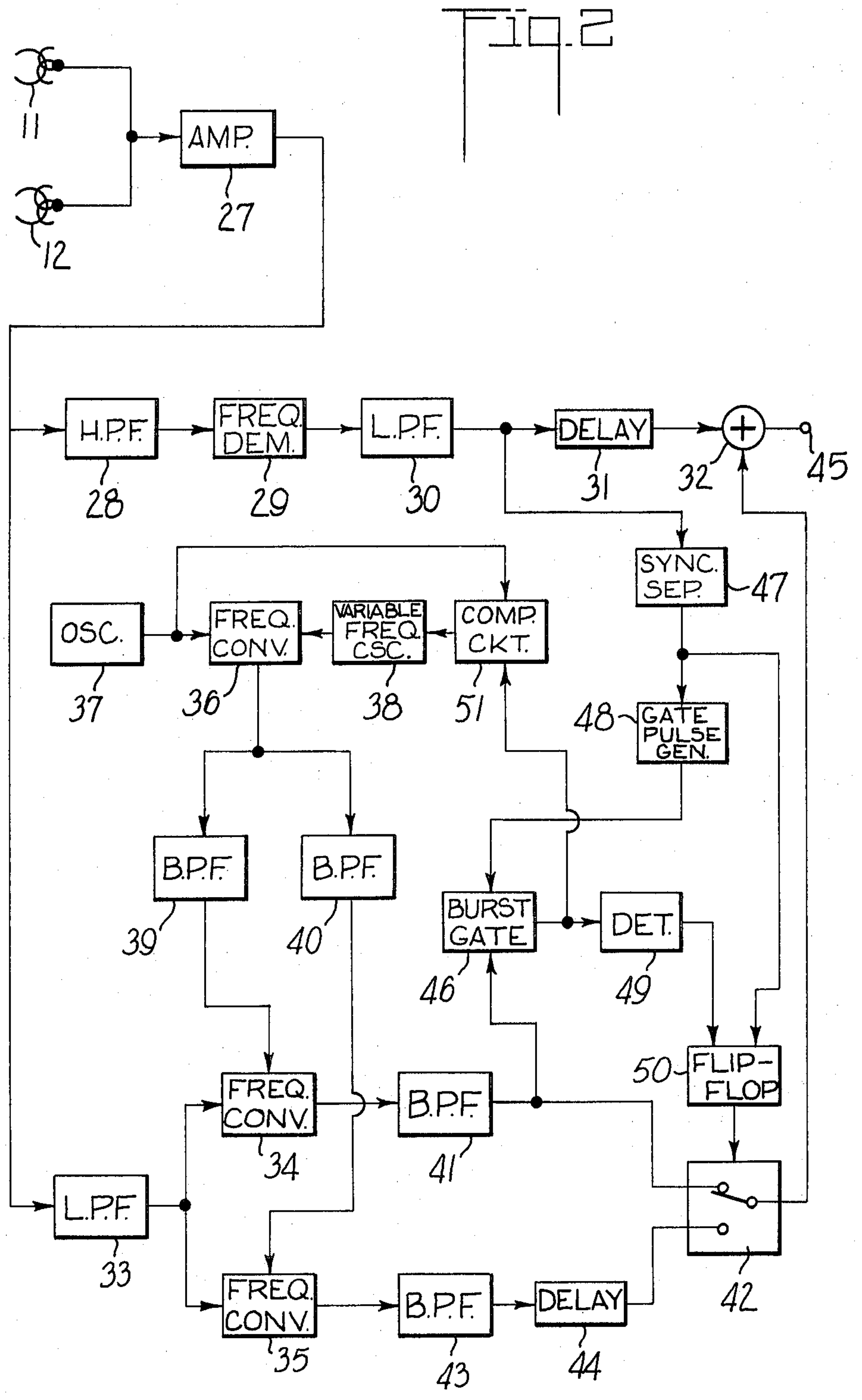
FIG. 2 is a block diagram of a playback device for reproducing PAL composite color television signals in accordance with the present invention.

One embodiment of a reproducing system according to this invention will be described with reference to FIG. 2. The recorded signal is picked up by the magnetic heads 11 and 12 and is supplied through a reproducing amplifier 27 to a high pass filter 28. At the output of the high pass filter 28, the signal that was frequency modulated by the luminance signal is extracted from the reproduced signal, and the luminance signal is reproduced from this frequency modulated signal by a frequency demodulator 29. The reproduced luminance signal is applied through a low pass filter 30 to a delay device 31 to delay the luminance signal by a time corresponding to the delay in the reproduced chrominance signal caused by passing through the chrominance channel. The output of the delay device 31 is connected to a mixer 32.

The amplifier 27 also supplies an output signal to a low pass filter 33 that passes the frequency converted and gated chrominance signal to first and second frequency convertors 34 and 35. This gated chrominance signal is composed of intermittent line intervals which have either the first or second red color difference signal, as explained above in the recording system.

A third frequency convertor 36 is provided and supplied with the output of an oscillator 37 which produces a signal having the frequency of the color subcarrier, for example 4.43 MHz, of the original chrominance signal. A variable frequency oscillator 38 is also connected to the frequency converter 36 to produce a signal having a frequency equal to the carrier frequency of the frequency converted chrominance signal. Consequently, the frequency converter 36 produces a first reference signal which has a frequency equal to the sum of the frequency of the original color sub-carrier (4.43 MHz) and the carrier frequency of the frequency converted chrominance signal (560KHz), that is, 4.43 MHz + 560KHz = 4.99MHz. The frequency converter 36 also produces a second reference signal which has a frequency equal to the difference between the frequency of the original color sub-carrier (4.43MHz) and the carrier frequency of the frequency converted chrominance signal (560 KHz), that is, 4.43 MHz − 560 KHz = 3.87 MHz.

The first reference signal is separated by a band pass filter 39 and is supplied to the first frequency converter 34. The second reference signal is separated by a band pass filter 40 and is supplied to the second frequency converter 35. At the first frequency converter 34, the chrominance signal is frequency reconverted to the original frequency band by subtracting the frequency of the frequency converted chrominance signal from the first reference signal and the resulting difference signal is passed through a band pass filter 41, for example, whereby a reconverted chrominance signal having the carrier frequency, 4.99 MHz − 560 KHz = 4.43 MHz is obtained.

The frequency converted chrominance signal from the filter 33 is frequency reconverted to the original frequency band by summing it with the second reference signal. The output of the second frequency converter 35 is passed through a band pass filter 43 to select the reconverted chrominance signal having the carrier frequency, 560KHz + 3.87MHz = 4.43MHz. Both of these two frequency reconverted chrominance signals have the carrier frequency of the original chrominance signal, but the output of the band pass filter 41 has only line intervals of the second red color difference signal, and the output of the band pass filter 43 has only line intervals of the first red color difference signal, as explained hereafter. The output of the band pass filter 41 is supplied to one fixed terminal of a single-pole, double-throw switch 42 directly, and the output of the band pass filter 43 is supplied to the other fixed terminal of the switch 42 through a delay circuit 44 which delays the signal for one line interval. The arm of the switch 42 moves from one fixed terminal to the other to change the switching state at every line period and takes out the supplied signals during alternate line periods, so that the chrominance signal having the original frequency and composed of the line intervals of the first red color difference signal and of the second red color difference signal are arranged alternatively in sequence. This chrominance signal is substantially a recreation of the original PAL chrominance signal.

The switch 42 is controlled by a flip-flop circuit 50 to change its state at every line period and the flip-flop circuit 50 is supplied with horizontal synchronizing signals in the luninance signal from a synchronizing signal separator 47.

A detecting circuit 51 is provided for comparing a burst signal in the frequency reconverted chrominance signal, which is extracted by a burst gate 46 controlled by gating pulses from a gate pulse generator 48, with the output of the oscillator 37 in order to detect frequency deviation of the burst signal, that is, the frequency deviation of the frequency reconverted chrominance signal, and to control the variable frequency oscillator 38 in response to the detected frequency deviation for changing the frequency of the first and second reference signals from the frequency converter 36 so as to compensate for the frequency deviation of the frequency reconverted chrominance signal.

The burst signal gated by the burst gate 46 is also supplied to a detecting circuit 49, and the detected output therefrom is supplied to the flip-flop circuit 50 to control the switch 42 so that the switch 42 passes the outputs of the band pass filter 41 and 43 to the mixer 32, alternately at correct line intervals to combine with the luminance signal. This results in a reproduced PAL color television signal at an output terminal 45.

The relationship between the frequency reconverted chrominance signals from the first and second frequency converters 34 and 35 will be explained hereinafter.

Figure 3:
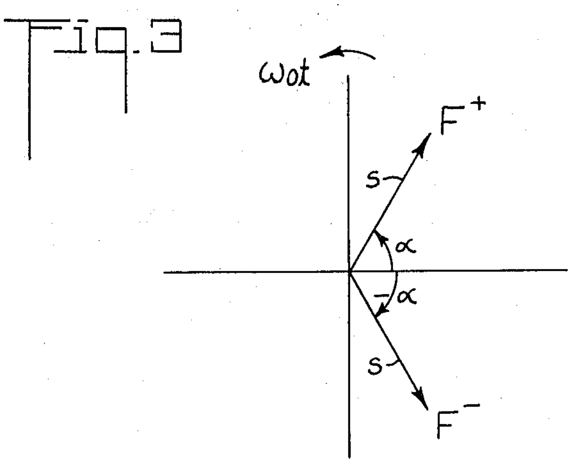
FIG. 3 is a phase diagram of signals generated in the circuits shown in the device in FIG. 2.

The original PAL chrominance signal F is referred to as F = $F^+$, $F^-$, $F^+$, $F^-$, ...... . That is, the original PAL chrominance signal F consists of one line interval $F^+$ having the first red color difference signal modulation axis and the next line interval $F^-$ having the second red color difference signal modulation axis. The change between $F^+$ and $F^-$ is arranged in alternating sequence. $F^+$ and $F^-$ are respectively defined as follows and shown in FIG. 3:

$$F^+ = S \cdot e^{j\alpha} \cdot e^{j\omega_0 t} = S \cdot e^{j(\omega_0 t + \alpha)} \qquad (1)$$

$$F^- = S \cdot e^{j\alpha} \cdot e^{j\omega_0 t} = S \cdot e^{j(\omega_0 t - \alpha)} \qquad (2)$$

where $\omega_0$ is an angular frequency of a color sub-carrier, $S$ represents a modulation signal, and $\alpha$ is a phase position of $F^+$ or $F^-$.

When $F^+$ and $F^-$ are frequency converted to the low frequency of the frequency converter 6 in FIG. 1 with a reference signal $F_r$ having an angular frequency $\omega_r$ from the oscillator 7, frequency converted signals $E^+$ and $E^-$ are obtained from $F^+$ and $F^-$, respectively, as follows:

$$F_r = e^{j\omega t}$$

$$E^+ = S \cdot e^{j[(\omega t - (\omega_0 t + \alpha)]} = S \cdot e^{j[(\omega - \omega_0)t - \alpha]} \qquad (3)$$

$$E^- = S \cdot e^{j[\omega t - (\omega_0 t - \alpha)]} = S \cdot e^{j[(\omega - \omega_0)t + \alpha]} \qquad (4)$$

To take a specific example, let it be assumed that onle $Y^+$ is gated at the gate 8 in FIG. 1 and recorded on the magnetic medium. In reproducing, the frequency converted chrominance signal $E^+$ is picked up by the magnetic heads 11 and 12 and is supplied to the first and second frequency converters 34 and 35 in FIG. 2. While the output of the oscillator 37 has an angular frequency $\omega_0$ and the output of the oscillator 38 has an angular frequency $\omega_r - \omega_0$, and, accordingly, the frequency converter 36 produces first and second reference signals $R_1$ and $R_2$.

$$R_1 = e^{j[\omega_0 t + (\omega r - \omega_0)t]} = e^{j\omega rt} \qquad (5)$$

$$R_2 = e^{j[\omega_0 t - (\omega r - \omega_0)t]} = e^{j(2\omega_0 - \omega r)t} \qquad (6)$$

These reference signals $R_1$ and $R_2$ are supplied to the first frequency converter 34 through the band pass filter 39 and to the second frequency converter 35 through the band pass filter 40, respectively. As a result, the first frequency converter 34 produces the frequency reconverted chrominance signals $F_1^{+\prime}$ and $F_1^{+\prime\prime}$.

$$F_1^{+\prime} = S \cdot e^{j[\omega rt - \{(\omega r - \omega_0)t - \alpha\}]} = S \cdot e^{j(\omega_0 t + \alpha)} \qquad (7)$$

$$F_1^{+\prime\prime} = S \cdot e^{j[\omega + \{(\omega r - \omega_0)t - \alpha\}]} = S \cdot e^{j[(2\omega r - \omega_0)t - \alpha]} \qquad (8)$$

The band pass filter 41 passes only $F_1^{+\prime}$ and therefore the output thereof is $$F_1^{+\prime} = S \cdot e^{j(\omega_0 t + \alpha)} \qquad (9)$$

At the same time, the second frequency converter 35 produces the frequency reconverted chrominance signals $F_2^{+\prime}$ and $F_2^{+\prime\prime}$.

$$F_2^{+\prime} = S \cdot e^{j[(2\omega_0 - \omega)t \{(\omega - \omega_0)t - \alpha\}]} = S \cdot e^{j[(3\omega_0 - 2\omega_0)t + \alpha]} \qquad (10)$$

$$F_2^{+\prime\prime} = S \cdot e^{j+(2\omega_0 - \omega) + \{(\omega - \omega_0)t - \alpha\}]} = S \cdot e^{j(\omega_0 t - \alpha)} \qquad (11)$$

The band pass filter 43 passes only $F_2^{+\prime\prime}$ and therefore the output thereof is $$F_2^{+\prime\prime} = S \cdot e^{j(\omega_0 t - \alpha)} \qquad (12)$$

As is apparent from formulas (1) and (9), and (2) and (12), $F_1^{+\prime}$ and $F_2^{+\prime\prime}$ are substantially regarded as the $F^{+\prime}$ and $F^{-\prime\prime}$ of the original chrominance signal respectively. Consequently, PAL chrominance signal that is ritually a recreated version of the original one is reproduced from the switch 42 which is supplied with $F_1^{+'}$ 4 and $F_2^{+''}$ .

As described above, according to the present invention the PAL color television signal is recorded and reproduced with the increased utilization of the magnetic medium.

In the above description, the embodiment where the line interval of the chrominance signal which has the first red color difference signal is gated and recorded is explained, however, it should be understood that it is, of course, possible to explain this invention similarly with reference to an embodiment where the line interval having the second red color difference signal is gated and recorded, though the explanation of such a case is eliminated.

What is claimed is:

1. A system for reproducing PAL composite color television signals from a magnetic recording in which alternate line intervals of at least frequency converted chrominance signals are recorded, said system comprising:

A. means to generate a first signal having a frequency equal to the sum of the PAL television color subcarrier frequency and the subcarrier frequency of the frequency-converted signal;
B. means to generate a second signal having a frequency equal to the difference between the PAL television color subcarrier frequency and the subcarrier frequency of the frequency converted signal;
C. a first chrominance channel comprising:
   1. a first frequency reconverter,
   2. means to apply said frequency converted signal and said first signal to said first frequency reconverter, and
   3. means to select from the output of said first reconverter a first reconverted chrominance signal having a subcarrier frequency equal to the PAL television color subcarrier frequency:
D. a second chrominance channel comprising:
   1. a second frequency reconverter,
   2. means to apply said frequency converted signal and said second signal to said second frequency reconverter, and
   3. means to select from the output of said second reconverter a second reconverted chrominance signal having a subcarrier frequency equal to the PAL television color subcarrier frequency;
E. means connected to one of said channels to delay one of said chrominance signals one line interval; and F. means to combine, alternately, one line interval of said first reconverted chrominance signal and one line interval of said second reconverted chrominance signal.

2. The system of claim 1 in which said delay means is connected between said means to select the reconverted chrominance signal in that channel and said means to combine.

3. The system of claim 1 comprising, in addition:

A. means to reproduce, from said magnetic recording, the luminance portion of said color television signals; and
B. means to combine said luminance portion with said alternate line intervals of said first and second reconverted chrominance signals.

4. The system of claim 1 in which said means to combine comprises:

A. a first input terminal connected to said first channel;
B. a second input terminal connected to said first channel;
C. an output terminal; and
D. means to connect said first and second input terminals to receive, alternately, said first and second reconverted chrominance signals applied to said first and second input terminals.

5. The system of claim 4 in which said means to combine comprises single-pole-double-throw switching means, and said means to connect said first and second input terminals.

6. The system of claim 5 comprising, in addition:

A. detecting means to detect the presence of chrominance channel; and
B. means controlled by said detecting means to control said switching means to connect said output terminal to said first and second input terminals during alternate line intervals corresponding to the intervals during which frequency reconverted chrominance signals are applied thereto.

7. The system of claim 6 in which said detecting means comprises:

A. a burst gate connected to one of said channels; and
B. gate pulse generating means synchronized by horizontal synchronizing signals of said composite signal to allow said burst gate to pass only burst signals from said one of said channels.

8. The system of claim 7 in which said burst gate is connected to the other channel from said delay means.

* * * * *